Dec. 1, 1953   F. ZIOMEK   2,660,874
SAFETY LOCK FOR AUTOMOBILE DOORS
Filed Oct. 1, 1951
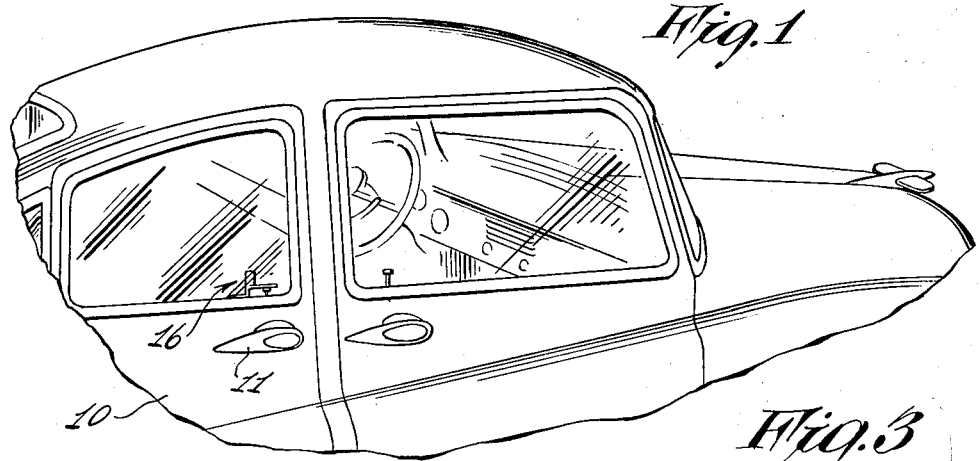
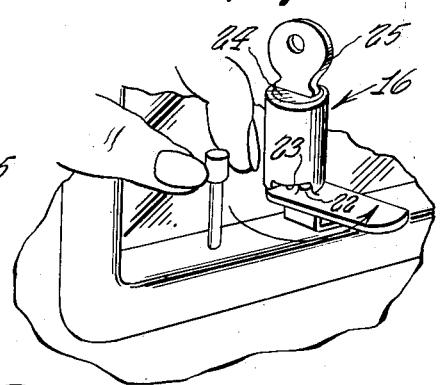
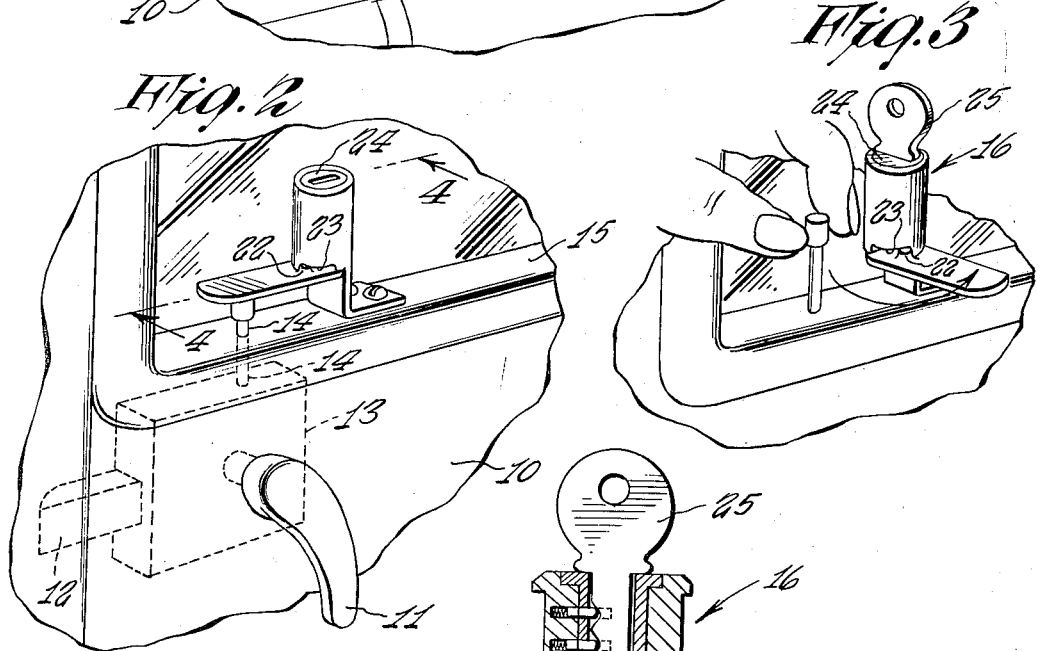
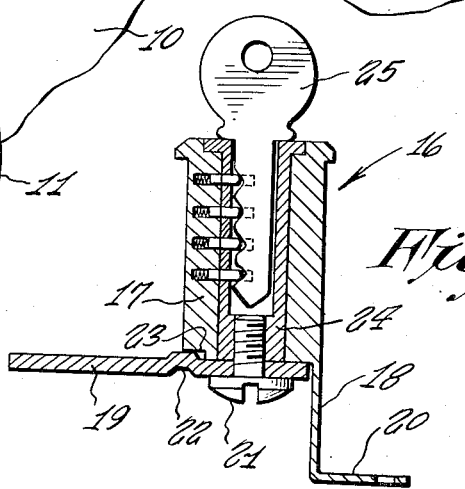
INVENTOR.
FRANK ZIOMEK
BY
J. Ledermann
ATTORNEY Patented Dec. 1, 1953

2,660,874

UNITED STATES PATENT OFFICE 2,660,874

SAFETY LOCK FOR AUTOMOBILE DOORS

Frank Ziomek, Brooklyn, N. Y.

Application October 1, 1951, Serial No. 249,064

7 Claims. (Cl. 70—181)

1

This invention relates to safety locks for automobile doors, and the main object is the provision of a novel, useful and practical locking means for locking the common vertically slidable safety bolt provided on the inside of automobile doors to prevent opening of the door.

As is well known, accidents frequently occur owing to the inadvertent opening of an automobile door while the vehicle is in motion, and this is particularly true of small children who are apt to release a door while experimentally fingering all things at hand. This invention provides a positive locking means to prevent release of the safety bolt so that the latter may be released only after the locking means has been operated by means of a key or otherwise.

The above as well as additional objects will be clarified in the following description, wherein characters of reference refer to like-numbered parts in the accompanying drawing. It is to be noted that the drawing is intended solely for the purpose of illustration and that it is therefore neither desired nor intended to limit the invention to any or all of the exact details of construction shown except insofar as they may be deemed essential to the invention.

Referring briefly to the drawing,

Fig. 1 is a fragmentary perspective view of an automobile having, merely by way of example, the instant invention applied to the rear door thereof.

Fig. 2 is an enlarged fragmentary perspective view of the automobile, illustrating the invention more clearly.

Fig. 3 is a view substantially similar to Fig. 2, showing the safety locking means in released position.

Fig. 4 is a sectional view taken on the line 4—4 of Fig. 2.

Referring in detail to the drawing, the numeral 10 indicates an automobile door provided with the handle 11 on the outside thereof for operation of the slide bolt 12 of the lock housing 13. Such doors are further provided with a vertical slide bolt or pin 14, slidably mounted in the window ledge or sill 15, to lock the slide bolt 12 in extended or locking position from within the vehicle. The structure so far described is standard, and it has therefore been deemed unnecessary to illustrate or describe the same in detail, other than to state that when the pin 14 is depressed the bolt 12 is prevented from being withdrawn into the housing 13 by turning the handle 11, and that normally the pin 14 lies in the raised position shown in Fig. 3.

2

The invention consists in the provision of an auxiliary lock 16 including an upstanding housing 17 which may be cylindrical, as shown. A leg 18 extends down from the housing 17 and has a horizontal extension or foot 20 by means of which the auxiliary lock may be attached, by means of a screw or screws, adjacent the pin 14, thus supporting the housing 17 in raised position above the sill 15. A horizontal plate or tongue 19 is pivotally attached by means of a screw or the like 21 to the lower end of the cylinder 17 and is provided with a raised projection 22. For a distance of about a quadrant, the lower edge of the cylinder 17 is recessed, as shown at 23, and the two ends of this quadrantal recess serve as limit stops to the projection 22 and hence to the movement of the tongue 19 on its pivot.

A cylinder lock barrel 24 is rotatably mounted in the housing 17, and the screw 21 registers threadably in a threaded opening in the lower end of the barrel, thus attaching the tongue 19 to this barrel. Any standard key-operated type of locking means may be provided in the housing 17 to permit a key, such as 25, to rotate the barrel 24, and hence the tongue 19, through a quadrant, from the position of the tongue shown in Fig. 4 to that shown in Fig. 3. It is thus apparent that, after depressing the pin 14, the tongue 19 may be swung over the pin to prevent lifting of the pin and hence prevent release of the slide bolt 12. Since it is necessary to insert the key 25 to rotate the tongue back to the position shown in Fig. 3, it is apparent that the door cannot be opened inadvertently, or by the groping of a small child, thus providing complete safety against accidental or unintentional opening of the door while the vehicle is in motion.

It is also to be noted that the device of this invention is very simple and inexpensive in cost of manufacture.

Obviously, modifications in form or structure may be made without departing from the spirit or scope of the invention.

I claim:

1. In a vehicle door having a slide bolt lock for locking the bolt in extended position and including a window sill and a pin vertically slidably mounted in said sill engageable with said bolt for locking said bolt in extended position when said pin is depressed, the improvement consisting of an auxiliary lock for releasably locking said pin in depressed position comprising an upright member mounted on said sill adjacent said pin, said upright member having a lock barrel rotatably mounted thereon in verticle position above said sill, said barrel having a horizontal tongue secured to the lower end thereof, said tongue being adapted to be swung horizontally from a position directly above and in contact with the top of said pin when said pin is depressed, through an arc to a position wherein said tongue is clear of said pin, and a key insertible into said barrel for thus swinging the same.

2. The improvement set forth in claim 1, said upright member including a vertical cylinder surrounding said barrel, the lower edge of said cylinder having a recess therein of a circumferential length at least equal to the length of said arc, the upper edge of said tongue having an upward projection thereon registering in said recess and having a width substantially less than said length of said recess.

3. In combination with a support having a pin slidably mounted in and projecting from the support and provided with limit stops limiting the pin between an outer extended extreme position and an inner depressed extreme position with respect to the support, means for locking said pin releasably in said inner extreme position and simultaneously covering the outer extremity of said pin comprising an arm secured to said support adjacent said pin, said arm having a member rotatably mounted thereon on an axis parallel with the pin, said member having a tongue secured to the lower end thereof and extending substantially at right angles thereto, said tongue being positioned at a distance from said support substantially equal to the distance of the projecting extremity of the pin when the pin is in said extreme inner position, said member being adapted to be swung on its axis from a position wherein the tongue is adjacent the outer extremity of the pin and in alignment with the pin through an arc to a position wherein said tongue is out of alignment with the pin, said tongue covering said outward extremity of the pin in said depressed position of the pin and with said tongue in alignment with the pin as aforesaid and thereby providing a cover over said pin to prevent grasping of the pin.

4. The combination set forth in claim 3, said member comprising a key lock barrel, and a key insertible into said barrel for thus swinging the member.

5. The combination set forth in claim 3, said arm having a cylinder rigid thereon surrounding said member, that end of said cylinder nearest the support having a recess therein of a circumferential length at least equal to the length of said arc, said tongue having a projection thereon registering in said recess and having a width substantially less than said length of said recess.

6. The combination set forth in claim 3, said arm having a cylinder rigid thereon surrounding said member, that end of said cylinder nearest the support having a recess therein of a circumferential length at least equal to the length of said arc, said tongue having a projection thereon registering in said recess and having a width substantially less than said length of said recess, said member comprising a key lock barrel, and a key insertible into said barrel for thus swinging said member.

7. The combination set forth in claim 3, said tongue having a width at least equal to the diameter of said pin thereby concealing said extremity of the pin therebehind.

FRANK ZIOMEK.

References Cited in the file of this patent
UNITED STATES PATENTS

| Number | Name | Date |
|---|---|---|
| 1,190,685 | Teachout et al. | July 11, 1916 |
| 1,880,135 | Heath | Sept. 27, 1932 |
| 2,582,237 | Dall | Jan. 15, 1952 |